US008244070B2

(12) United States Patent
Chapman et al.

(10) Patent No.: US 8,244,070 B2
(45) Date of Patent: Aug. 14, 2012

(54) REAL-TIME IMAGE PERSONALIZATION

(75) Inventors: Edward Chapman, Rochester, NY (US); Hengzhou Ding, West Lafayette, IN (US); Reiner Eschbach, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 723 days.

(21) Appl. No.: 12/475,748

(22) Filed: Jun. 1, 2009

(65) Prior Publication Data

US 2010/0302594 A1 Dec. 2, 2010

(51) Int. Cl.
*G06K 9/32* (2006.01)
(52) U.S. Cl. ........ 382/293; 382/294; 382/295; 382/296; 382/297; 382/298
(58) Field of Classification Search .................. 382/100, 382/103, 154, 264, 284, 291, 292, 293, 294, 382/295, 296, 297, 298; 358/1.9
See application file for complete search history.

(56) References Cited

U.S. PATENT DOCUMENTS

| 5,995,724 A | 11/1999 | Mikkelsen et al. |
| 2006/0008177 A1 | 1/2006 | Chermont et al. |
| 2008/0170748 A1 * | 7/2008 | Albertson et al. ............ 382/103 |
| 2008/0253608 A1 * | 10/2008 | Long et al. .................... 382/100 |
| 2008/0309980 A1 | 12/2008 | Iguchi |

OTHER PUBLICATIONS

Ding, H., Bala, R., Fan, Z., Eschbach, R., Bouman, C.A., Allebach, J.P., "Semi-Automatic Object Geometry Estimation for Image Personalization", Computational Imaging VIII, SPIE-IS&T, vol. 7533, Feb. 4, 2010 pp. 753304-1 to 753304-11.
Partial European Search Report for Application No. EP 10 16 4202, completion date Jun. 29, 2011.

* cited by examiner

*Primary Examiner* — Brian Le
(74) *Attorney, Agent, or Firm* — Fay Sharpe LLP (57) ABSTRACT

Systems and methods are described that facilitate real-time personalization of an electronic image by overlaying a text string on a planar surface of an object in the electronic image. A linear or affine transform is executed on a selected text string to position the text string in a reference rectangle or text box. A non-linear or projective transform is applied to the rectangular text box to project the box into a user-defined quadrilateral on the planar surface in the image. A page description language (PDL) file is generated and includes the transformed quadrilateral text box overlaid on the electronic image. At print-time, a database (e.g., a spreadsheet or the like) containing multiple text strings is read, once for each text string, and multiple images are printed. Each printed image has one of the text strings overlaid thereon, on the planar surface defined by the quadrilateral.

16 Claims, 8 Drawing Sheets
(4 of 8 Drawing Sheet(s) Filed in Color)

REAL-TIME IMAGE PERSONALIZATION

BACKGROUND

The subject application relates to image personalization systems and methods. While the systems and methods described herein relate to electronic image formation in computing systems and the like, it will be appreciated that the described techniques may find application in other image formation systems, other xerographic applications, and/or other imaging methods.

Image personalization has gained interest in recent years in print applications, and many different applications exist, among them XMPie's "uImage," and packages by Alphapictures, and DirectSmile. The packages have a different emphasis and strengths, but all deal with complex scenes. This includes curved surfaces such as car windshields, or varying text characteristics as if written into snow, sand, leaves or the like.

In all systems, a photorealistic result is intended, since the application area typically includes calendars, postcards and other types of artifacts that display images of natural scenes. With the existing solutions, the process of creating these personalized images is often cumbersome and complicated, requiring a high level of skill and experience on the part of the designer, or the use of preselected photos. Moreover, sophisticated rendering effects place considerable demands on computation and storage, and thus must be either carried out offline, or by dedicated high-end servers.

All three of the aforementioned packages produce high quality artifacts in their application domain, but none of them is applicable to real-time, digital front end (DFE)-based processing and printing and are thus normally not part of the print-generating Raster Image processor (RIP). This is also caused by the large data amount that has to be communicated to the machine (e.g., each image is unique and transmitted separately). Approaches exist to transmit image sections, but these have their own set of unique problems. Here and in the following the term "real-time" is used to indicate a processing speed comparable to the actual print speed of the output device.

Accordingly, there is an unmet need for systems and/or methods that create a variable data image in a simple fashion, and that does not require additional data transfer or upstream processing, while overcoming the aforementioned deficiencies.

BRIEF DESCRIPTION

In accordance with various aspects described herein, systems and methods are described that facilitate the creation of personalized images in a simple and fast way. For example, a method of real-time personalization of an electronic image for printing comprise receiving input coordinates for vertices of a quadrilateral deemed to lie on a planar surface represented in an electronic image, reading one or more variable text strings from a database, and performing an affine transform to fit each text string into a rectangular text box. The method further comprises performing a non-linear projective transform on the rectangular text box to move vertices of the rectangular text box to the vertices of the quadrilateral, and rendering each transformed text string in the quadrilateral on a respective version on the electronic image.

According to another feature described herein, a system that facilitates performing real-time personalization of electronic images comprises a processor that executes computer-executable instructions stored to a memory, including instructions for receiving input coordinates for vertices of a quadrilateral deemed to lie on a planar surface represented in an electronic image and for reading one or more variable text strings from a database. The processor further executes instructions for executing an affine transform to fit each text string into a rectangular text box, performing a non-linear projective transform on the rectangular text box to move vertices of the rectangular text box to the vertices of the quadrilateral, and rendering each transformed text string in its quadrilateral on a respective version on the electronic image. The system further comprises a printer that prints the electronic image with the text string positioned in the quadrilateral on the electronic image.

Yet another feature relates to a method of personalizing an electronic image comprises identifying a planar surface in the image, delineating a quadrilateral on the planar surface, and inserting a variable text string into a rectangular text box using an affine transform. The method further comprises projecting the text box into the quadrilateral using a non-linear transform, and rendering the projected text onto the planar surface in the image and outputting a modified electronic image.

BRIEF DESCRIPTION OF THE DRAWINGS

The file of this patent contains at least one drawing executed in color. Copies of this patent with color drawings(s) will be provided by the Patent and Trademark Office upon request and payment of the necessary fee.

DETAILED DESCRIPTION

In accordance with various features described herein, systems and methods are described that overcome the above-described problems by restricting the rendering to "flat" (i.e. planar) surfaces, permitting (without requiring) the variable data to be photorealistic, and by approximating some of the transform data with a simple non-physical derivation. In this manner, a real-time 3-D approximation is generated that is sufficiently realistic to catch the eye, but that is also extremely simple to create and compute, thus enabling RIP/DFE implementation. That is, a realistic text overlay for an image is generated in real-time, where "realistic" refers to the geometric structure, omitting texture, lighting and other higher order elements. The described systems and methods are applicable to Variable Information Postscript Printware (VIPP), as well as Automatic Dynamic-Object Replacement (e.g., XMPie) workflows that transmit an image a single time and subsequently only submit the variable text string to the DFE. In this manner, the described systems and methods differ from classical approaches that transmit completely individualized images separately for every data entry, which cannot be performed in real-time. The real time capability of the described systems and methods is achieved by adjusting the active device coordinates of a printer (e.g., inside the page description language (PDL)) and by rendering an appropriately modified data string into this temporary coordinate system.

The systems and methods described herein thus facilitate real-time variable data image personalization that can operate in a VIPP scenario where all processing is done on the DFE at RIP-time, i.e.: at the actual time the print is generated. As such, it is distinguished from systems that require off-line processing and large data transfer (e.g., wherein each personalized image is generated and transmitted separately). Thus, the innovation fills a gap between high-end (compute intensive) applications and pure text-based personalization, and thus has the ability to create more attractive documents in areas that are currently not amenable to image personalization, e.g., in the trans-promotional arena.

Figure 1:
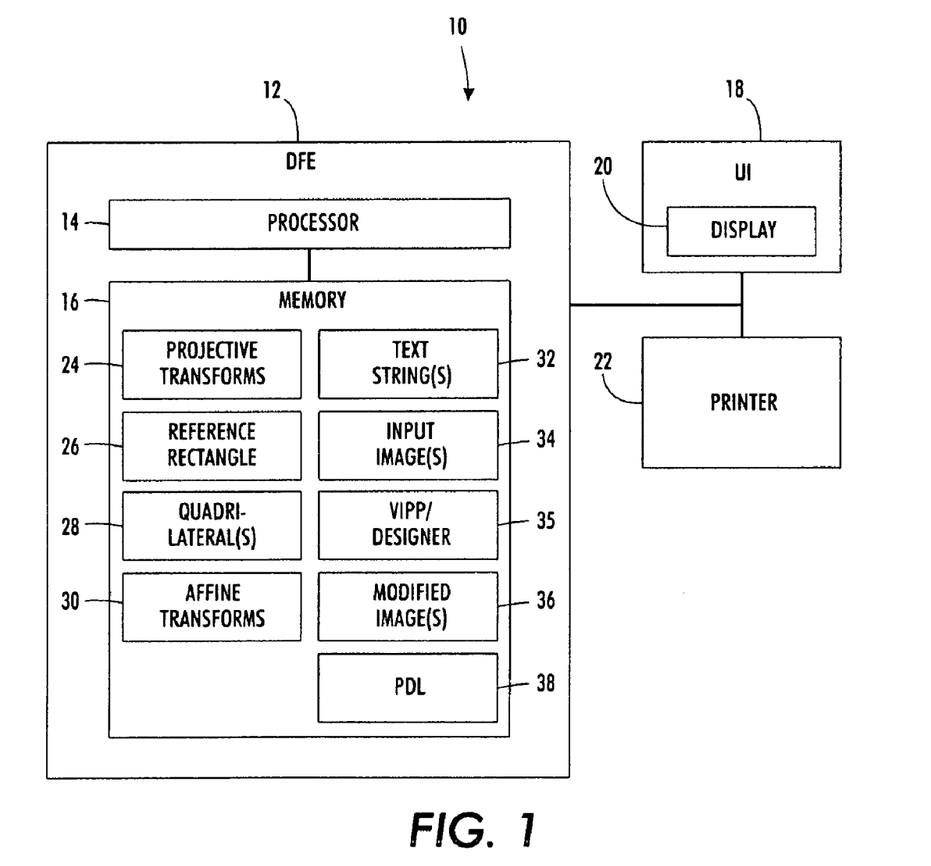
FIG. 1 illustrates an image personalization system is illustrated that facilitates real-time generation of text overlay for an electronic image and printing of the electronic image with multiple different text strings.

With reference to FIG. 1, an image personalization system 10 is illustrated that facilitates real-time generation of text overlay for an electronic image and printing of the electronic image with multiple different text strings. The system 10 includes a digital front end (DFE) 12 that includes a processor 14 that executes, and a memory 16 that stores, one or more sets of computer-executable instructions for carrying out the various methods and/or techniques described herein, to provide the described functionality. The DFE is coupled to a user interface 18 that includes a display 20. The user interface and DFE are further coupled to a printer 22. A user enters information to the user interface (e.g., using a keyboard, mouse, stylus, or some other suitable input device), and views information provided by the DFE 12 and/or the printer 22 on the display 20. According to one aspect, the user interface 18 and display 20 are integral to the DFE 12 and/or to the printer 22.

The memory 16 stores a projective (e.g., non-linear) transform 24, one or more reference rectangles 26, and one or more quadrilaterals 28 to which the reference rectangles are projected (e.g., transformed) via the projective transform. The memory 16 also stores one or more affine (e.g., linear) transforms 30 that fits a text string 32 into a reference rectangle 26 prior to transformation into the quadrilateral 28, thereby permitting the text 32 to be transformed or warped with the rectangle 26 for overlay a selected planar surface in an input image 34 that is opened using a VIPP Designer 35 or the like. Once the transformed text has been overlaid on the input image 34, the modified image 36 is optionally stored to memory 16 for printing by the printer 22 and/or output on the display 20. The "modified" image comprises the original input image with transformed text overlaid thereon. Other than the overlay of the transformed text, the input image need not be modified. Therefore, in another example, the transformed text is stored to memory 16 and output concurrently with the input image file to generate the "modified" image.

According to an example that relates to planar objects inside a photograph or scene (e.g., in an electronic image), the geometric transform of a plane to an arbitrary viewpoint or camera point can be described by the well known projective transform 24 that is executed by the processor 14, and which is stored in the memory 16, as:

$$\begin{bmatrix} x' \\ y' \\ w \end{bmatrix} = \begin{pmatrix} a_x & a_y & a_0 \\ b_x & b_y & b_0 \\ c_x & c_y & 1 \end{pmatrix} \begin{bmatrix} x \\ y \\ 1 \end{bmatrix} \quad (1)$$

where (x, y) is the location of a point on the plane with respect to a first or reference camera viewpoint, and (x', y') is the location of that same point with respect to a second camera viewpoint. Without loss of generality, it may be assumed that the plane of the reference camera is parallel to that of the object. The 3×3 description in homogeneous coordinates is considerably more tractable than 4×4 transforms for general objects, as is the subsequent mapping of the z-component into the 2-D paper structure because a 2-dimensional plane does not alter the visibility of any point on the plane, whereas a 3-dimensional surface will have points moving in and out of shadow (e.g., invisible) spots. These hidden areas would be handled with a complete and more complex 3-dimensional calculation.

Since the entire personalized image approach is a real-time (e.g., VIPP) process, the projective transform 24 given by equation (1) is mapped to a page description language (PDL) file 38 (e.g., Postscript or another suitable PDL). In this context, a general perspective transform is not available as one of the Postscript basic matrix transform concepts. Rather, a current transform matrix (CTM) is executed via affine transforms 30 stored in the memory 16. The CTM affine transform 30 is thus used to virtually render the text 32 into a reference rectangle 26.

There remains the second step of transforming the rectangle 26 into a quadrilateral 28 via the projective transform described by Equation (1). An additional option for geometric transformations of graphical elements in Postscript may be employed to achieve this transformation. Specifically for text, the "character path" (charpath) is a native Postscript command that gives the path for the indicated string. This charpath data is transformed with the matrix of Equation (1).

Two transforms are thus concatenated by the processor 14: the affine transform 30 (e.g. via CTM), which is a different transform for each text string, followed by the projective transform 24 (e.g., a fixed homogeneous matrix transform) applied to the charpath. In this way, the matrix inversion is performed to arrive at Equation (1) only once for any given background image 34, and all variable text strings 32 can re-use the same transformation. It will be appreciated, however, that, dependent on compute power, it may be more convenient to only use one transform and invert the homogenous matrix for each job record.

Figure 2:
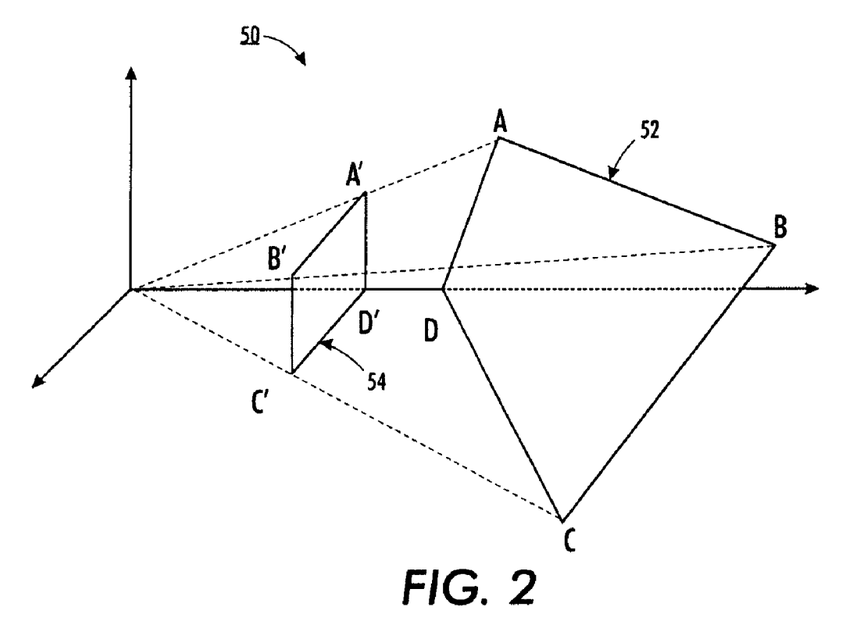
FIG. 2 illustrates a perspective projection of a quadrilateral having vertices ABCD from a rectangle having vertices A'B'C'D', with a camera located at the origin Q.

With continued reference to FIG. 1, FIG. 2 illustrates a perspective projection 50 of a quadrilateral 52 having vertices ABCD from a rectangle 54 having vertices A'B'C'D', with a camera located at the origin Ω. The projection 50 represents an example of a conversion (e.g., such as may be performed by the processor 14) of the convex quadrilateral shape 52 from a rectangle 54, projected onto a flat surface that has an arbitrary orientation in 3-D space. In one example, the processor 14 executes the projective transform 24 to transform the quadrilateral 52 from the rectangle 54. In this example, perspective projections (dotted lines) for each quadrilateral vertex A,B,C,D are targeted from the origin Ω through respective corresponding rectangular vertices A',B',C',D'. In another example, the processor inverts the transform matrix from the projection.

For a given perspective point, rectangles of arbitrary size, but constant aspect ratio, can be created. It will be understood that the projection can also extend to the right of the quadrilateral. It will also be understood that by changing the perspective point, e.g., the origin, other aspect ratios can be achieved, and thus that the quadrilateral 52 can be mapped to any arbitrary rectangle 54. This feature permits the system 10 to map arbitrary rectangles into a given quadrilateral. For the inversion of the transformation matrix, the quadrilateral coordinates A, B, C, D (e.g., the coordinates within the image on which text is to be overlaid) are determined or retrieved, as are the coordinates of an arbitrary rectangle, which is selected based on other convenient parameters. Such parameters are clarified in the Postscript (PDL) part of the projection.

As noted above, any rectangle can be transformed into the quadrilateral ABCD. Since a matrix inversion is to be performed for any rectangle A'B'C'D', it may be desirable to use a fixed reference rectangle to reduce the rendering problem to the placing of variable text into a fixed rectangular area.

It should be noted that FIG. 2 represents a clear deviation from existing packages since it implicitly requires the receiving quadrilateral 52 is the projection of a real rectangular object. In other words, the quadrilateral in the image represents an actual rectangle in the real 3-dimensional world.

Figure 3:
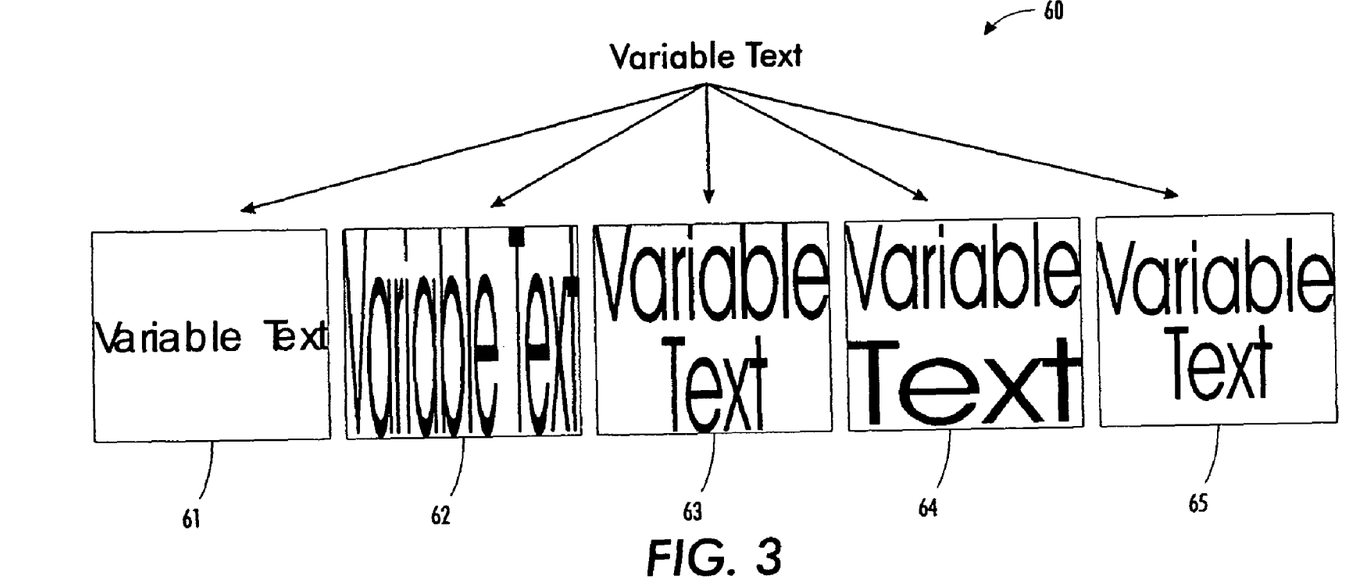
FIG. 3 illustrates a plurality of solutions to placing variable text into a fixed rectangle.

FIG. 3 illustrates a plurality of solutions 60 to placing variable text into a fixed rectangle. The string "variable text" is placed into a given rectangle. For instance, in a fixed rectangle 61, the text string is stretched laterally across the fixed rectangle. In the rectangle 62, the text string is stretched vertically and laterally to fill the rectangle. In rectangle 63, the two words of the text string are placed in the rectangle in a vertical orientation relative to each other, and the word "variable" extends laterally across the width of the rectangle while both words extend vertically to fill the rectangle. In the rectangle 64, the two words of the text string are placed in the rectangle in a vertical orientation relative to each other, and both words extend laterally and vertically to fill the rectangle. In the rectangle 65, the two words of the text string are placed in the rectangle in a vertical orientation relative to each other, and extend laterally to span the width of the rectangle.

From FIG. 3 it is clear that the described approach need not yield a unique answer, since the rectangles 61 through 65 will be mapped into a quadrilateral just as rectangle 54 of FIG. 2 is mapped into quadrilateral 52. In this manner real-time processing is enabled. In essence, the approach shown here is limited to standard fonts on a flat surface, such that an exact determine of text aspect ratio need not be performed since the text-receiving surface is flat.

The five different solutions of FIG. 3 are "valid" solutions in a mathematical sense. Depending on a given application one such solution may be preferred over another by a user. It will be noted that in Postscript, full access to the aspect ratio of the input string is available for any pre-specified font, as well as access to information indicating whether there are any "blank" characters in the text string. Anamorphic scaling can thus be limited to a given range, and switching between different scalings based on that information is possible. Additionally, a blank character in the text string can be replaced with a line break, if desired.

In VIPP applications, the variable data string is read from a database field. Accordingly, an aspect ratio or size of the reference rectangle that is a statistical representative of the database field can be preselected. For example, a first-name field can assume a median name length of six characters (or some other suitable predetermined number of characters). In another example, an estimate for the aspect ratio can be derived from the quadrilateral as:

$$AR = \frac{\overline{AB} + \overline{CD}}{\overline{AD} + \overline{CB}}. \qquad (2)$$

These choices and the exemplary renderings of FIG. 3 can be supplied to the user or designer via the user interface 18, e.g. as part of the VIPP ProPublisher. Fitting the text into the rectangle is standard VIPP/Postscript functionality. The scaling methods or techniques used to generate the solutions of FIG. 3 optionally can be included as a field attribute.

Figure 4:
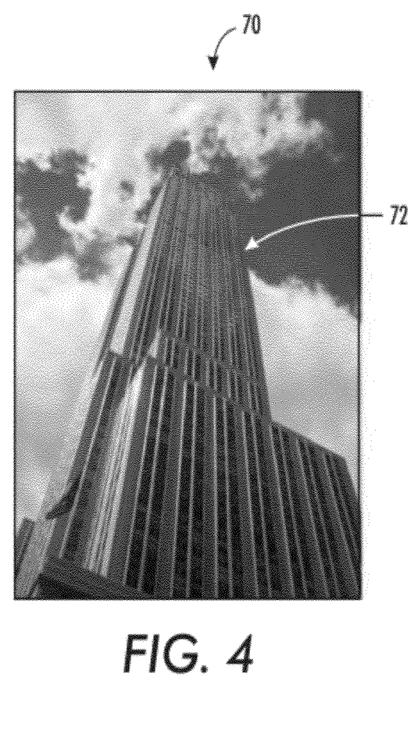
FIG. 4 shows an electronic image of a building.
Figure 5:
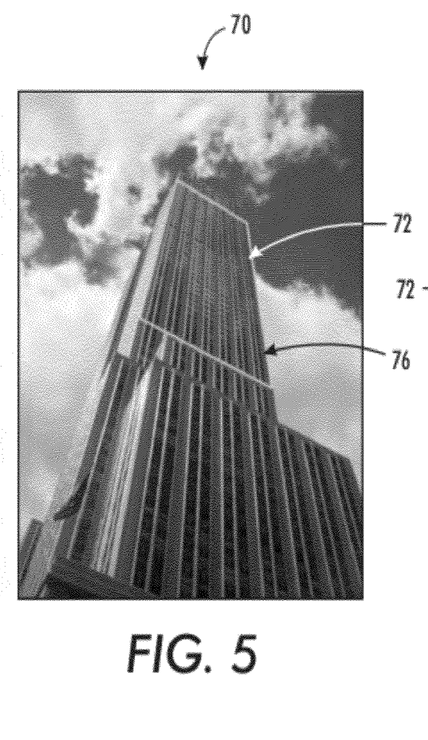
FIG. 5 shows the electronic image of the building with a quadrilateral overlaid thereon.
Figure 6:
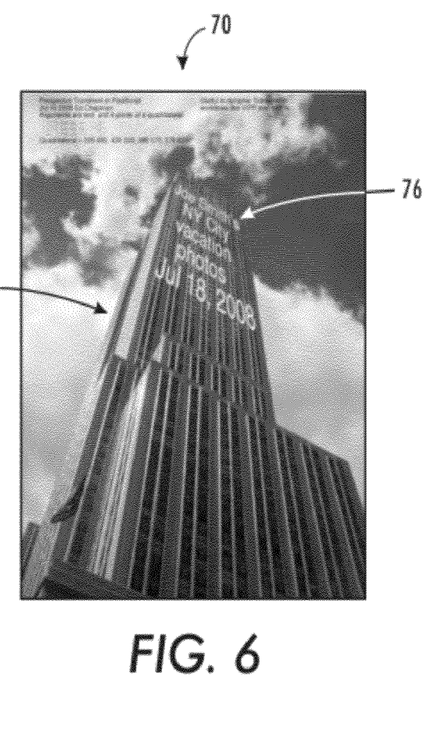
FIG. 6 shows the image of the building with a text string overlaid thereon.

FIGS. 4-6 illustrate various stages of an image on which text is overlaid using the herein-described techniques, to illustrate how real-time personalization of images conceptually operates inside VIPP and the VIPP Designer.

FIG. 4 shows an electronic image 70 of a building 72. Using the described systems and methods, a customized text string is overlaid on a planar surface of the building 72 in the image 70. Thus, as a first step, a suitable background image is selected, which can be opened in the VIPP Designer 35 (FIG. 1), and the quadrilateral 28 can be hand selected or otherwise input by a user.

FIG. 5 shows the electronic image 70 of the building 72 with a quadrilateral 74 overlaid thereon. The quadrilateral 74 may be hand-drawn by a user. Into the quadrilateral 74, a text string may rendered, as shown in FIG. 6.

FIG. 6 shows the image 70 of the building 72 with a text string 76 overlaid thereon. The text sting reads "Joe Smith's NY City vacation photos Jul. 18, 2008." For instance, the text may be fitted to a reference rectangle as described with regard to FIGS. 1 and 3, and the reference rectangle may be transformed into the quadrilateral that overlays a selected planar surface on the building 72. The text in the reference rectangle is adjusted or transformed with the reference rectangle to fit into the area defined by the quadrilateral as illustrated in FIG. 6. In this manner, the custom text 76 is overlaid on the image 70 in a user-selected region (e.g., the quadrilateral) for output to a printer or display on a user interface.

As can be seen from FIG. 6, the text string 76 is positioned in the image in visually pleasing manner, in a real-time implementation. For example, the text string is overlaid onto the building, without necessarily following any building contour or texture. As such, it appears as lettering attached to the building. Additionally, in this example, the text is single-colored without any image-dependent lighting changes. Moreover, the user-drawn quadrilateral may be imprecise, and a close examination of the text may reveal that the text is slightly off perspective. However, the image of FIG. 6 is clearly usable and has a clear personalized attribute. At the same time, however, FIG. 6 is a good example of the distinction of this method from previous methods, trading off the photorealistic quality for processing speed.

The description thus far illustrates how a real-time 3D photorealistic rendering can be approximated if certain simplifications are made. Firstly, the receiving surface is "flat," allowing the rendering to be done as a two step real-time transformation of mapping text into a rectangle and subsequently mapping the rectangle into the receiving quadrilateral. Secondly, the rendered text may be restricted to simple text operations, disallowing visual effects like writing in snow, in sand, and the like. Thirdly, the text characteristics in terms of size, serif/sans-serif, font-shape, etc., is not related to other text inside the image. For example, the text attributes of the added text to a subway sign need not match precisely other text on that sign or nearby. The text attributes of the added text on a billiard table need not precisely match the other balls on the table, etc. Fourthly, the receiving image quadrilateral represents a rectangle in the actual three dimensional scene.

These four restrictions distinguish the resulting images from the images created in an elaborate system in terms of visual appearance, but as mentioned earlier, they also permit real-time processing on common DFE/RIP systems and thus are advantageous in many situations.

In the above description, no mention has been made about the initial definition of the quadrilateral inside the image. In one example, this quadrilateral is automatically determined. In another example, the four corners of the quadrilateral are defined through direct user input. Here, it is understood that the four corners can be defined as four distinct points or as intersection of straight lines, etc. Thus various user interactions exist that result in the definition of four points for the subsequent processing.

Figure 7:
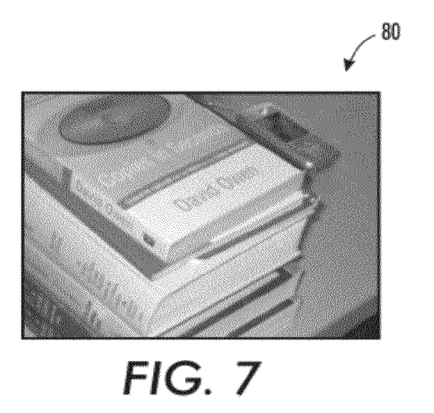
FIG. 7 shows an image of a textbook having planar surfaces on which a user can define a quadrilateral for text overlay to personalize the image.
Figure 8:
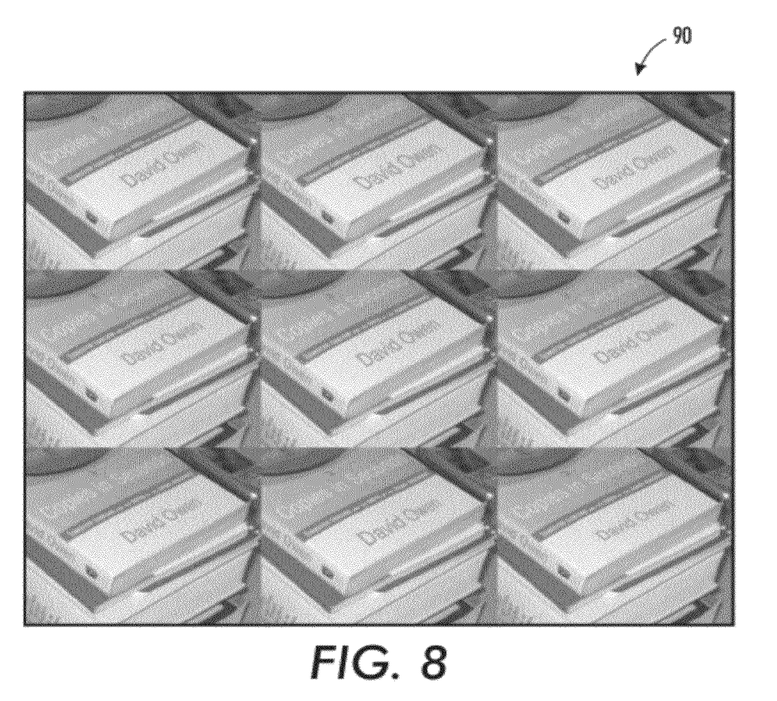
FIG. 8 shows nine different user-defined quadrilaterals into which text has been inserted.

In order to address the "precision" with which standard users may create the quadrilateral, the examples of FIGS. 7-8 are provided below. The image 80 of FIG. 7 was provided to 9 different users, who were asked to define a quadrilateral for insertion of a text string overlay. In FIG. 8, the name string "David Owen" was then inserted into the same picture (after the original "David Owen" string of FIG. 7 had been erased) to give the nine results shown in FIG. 8.

Closer examination of FIG. 8 shows that some examples are imperfect with respect to the geometry, such as the lower-middle representation. However, all nine renditions are still very useful (e.g., in a trans-promo application or the like).

Figure 9:
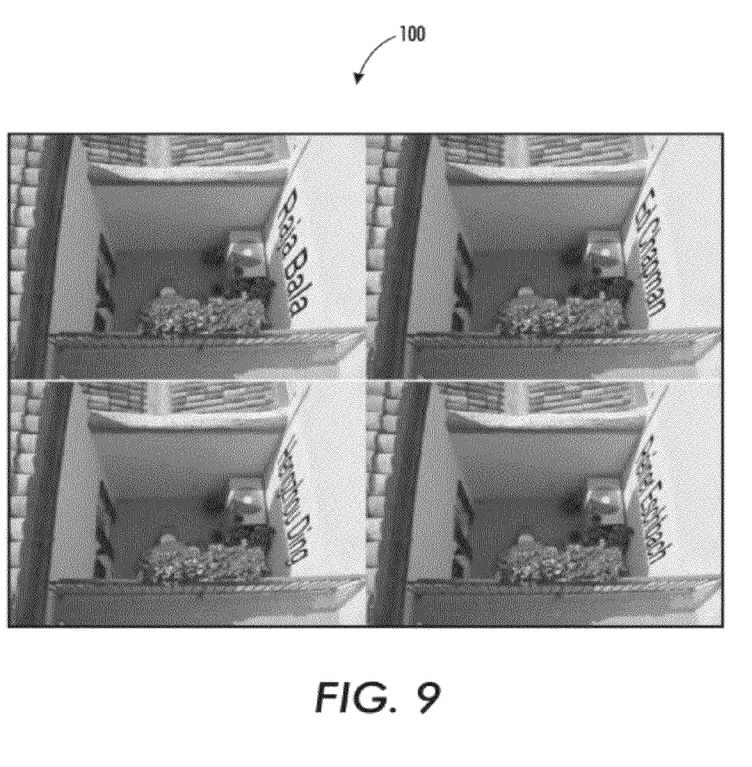
FIG. 9 shows an additional image, for which a quadrilateral is generated by clicking four points on a given image, without any visual aid or reference.
Figure 10:
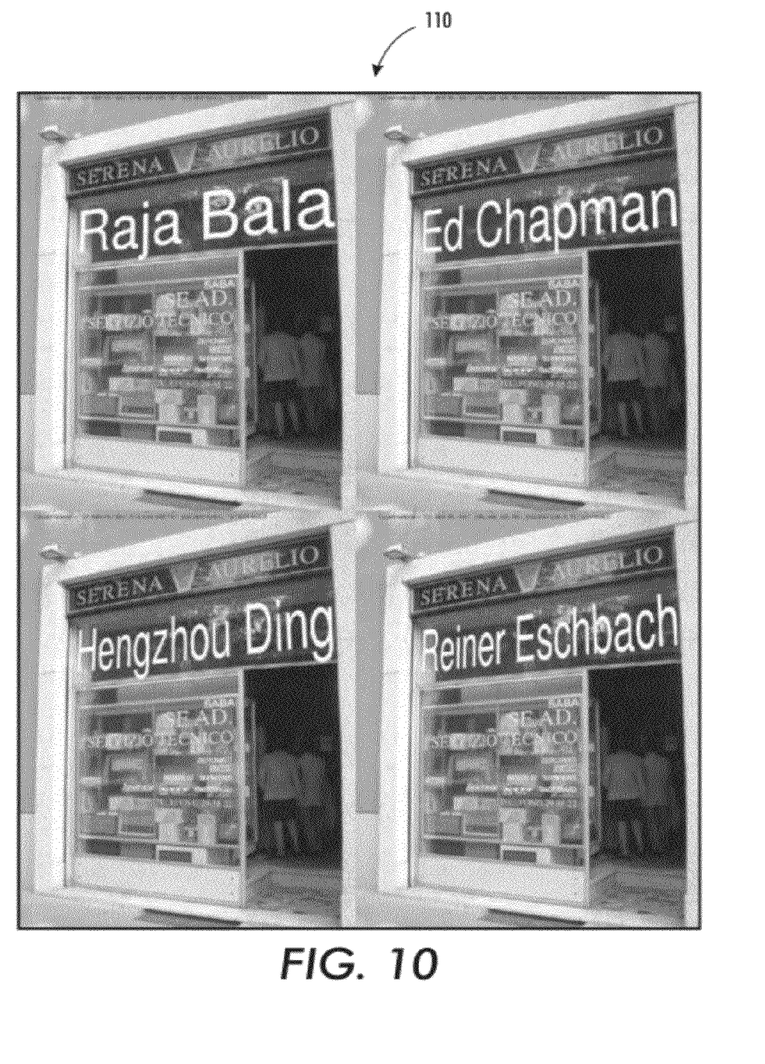
FIG. 10 shows another image, for which a quadrilateral is generated by clicking four points on a given image, without any visual aid or reference.

FIGS. 9 and 10 show additional images, for which a quadrilateral is generated by clicking four points on a given image, without any visual aid or reference. Variable text is then automatically rendered into the areas delineated by the user-generated quadrilaterals. In this example, an explicit matrix inversion may be employed. In the modified image renderings 100 of FIG. 9 (showing multiple versions of an input image of a balcony with different text strings overlaid thereon). FIG. 9 indicated the above mentioned distinction from existing computationally complex methods. As can be seen in the descenders of the letters "j", "p", and "g", no illumination change need be performed in the proposed method. The illumination change in the transition from bright sunlight to strong shadow need not be reflected in the descenders. Again, this simplification is provided to allow the described real-time rendering.

The image renderings 110 of FIG. 10 (showing multiple versions of an input image of a storefront with different text strings overlaid thereon), various different names are overlaid on the images using a VIPP-like structure (e.g., one photo and multiple name renderings thereon). As in FIG. 9, the difference to existing methods is visible in the lack of illumination changes which are caused by the shadow of the tree in the storefront window. However, just like in FIG. 9, the resultant photo-realistic quality is sufficient as an attention getter in mass produced items, such as the combination of transactional and promotional mailings.

Figure 11:
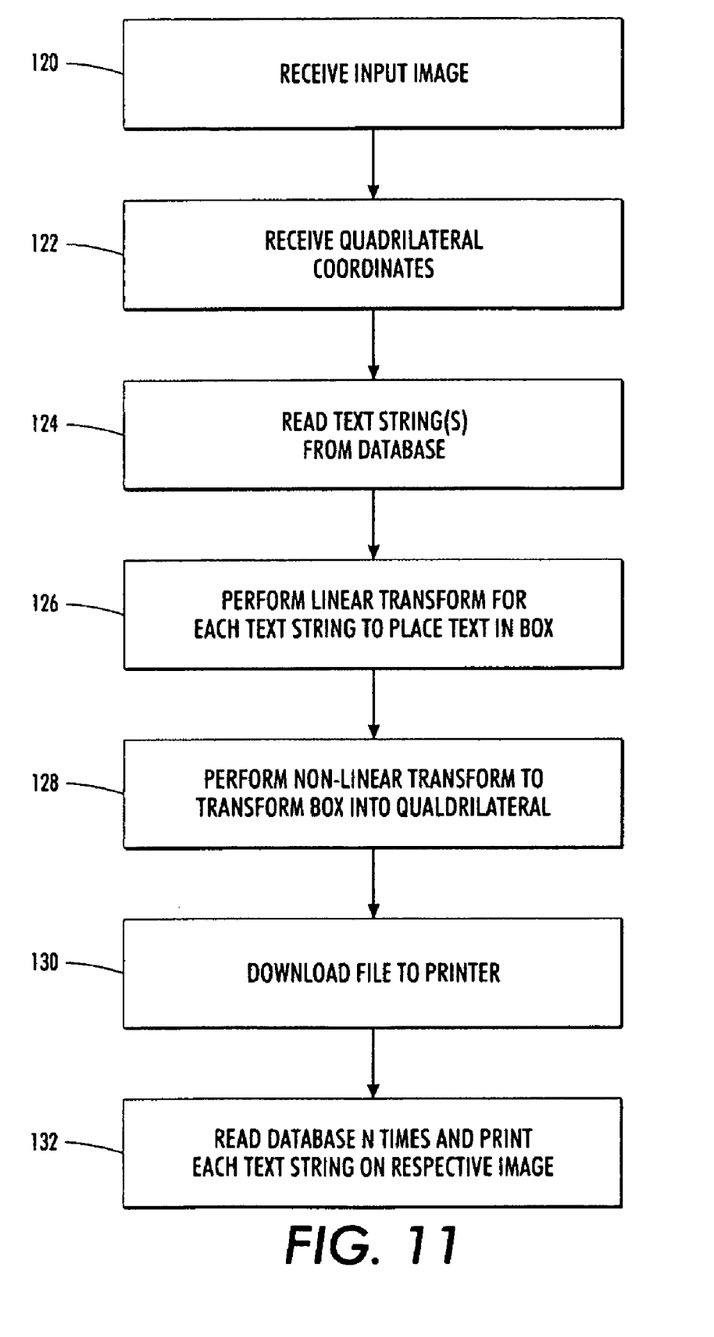
FIG. 11 illustrates a method for personalizing electronic images in real time, in accordance with various aspects described herein.

FIG. 11 illustrates a method for personalizing electronic images in real time, in accordance with various aspects described herein. At 120, an input image is received. The input image may be retrieved or selected from a database of images (e.g., pre-generated and/or updated by a user with user-captured or selected images). At 122, quadrilateral coordinates are received. For instance, a user may input or select vertices for a quadrilateral on a graphical display of the input image (e.g., on a computer screen or the like), where the vertices define a quadrilateral on a planar surface in the image. At 124, one or more text strings are read from a database for overlay on the input image. For instance, the user may input the one or more text strings into the database for overlay on the image.

At 126, a linear transform is executed, which for each text string to position the text string in a reference rectangle (e.g., a text box). At 128, a non-linear transform is executed to transform the reference rectangle into the quadrilateral. That is, vertices of the reference rectangle are repositioned at corresponding vertices of the quadrilateral, to deform the rectangle into the quadrilateral. At 130, the file is downloaded to a printer (e.g., a marking engine or the like) for printing. At 132, the text string database is read N times (e.g., once for each text string), and the image is printed N times (e.g., once for each text string), such that each text string is printed in the quadrilateral on a separate instance of the image to create a modified or output image with the text strings overlaid thereon.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of real-time personalization of an electronic image for printing, comprising:
receiving input coordinates for vertices of a quadrilateral deemed to lie on a planar surface represented in an electronic image;
reading one or more variable text strings from a database;
performing an affine transform to fit each text string into a rectangular text box;
performing a non-linear projective transform on the rectangular text box to move vertices of the rectangular text box to the vertices of the quadrilateral; and
rendering each transformed text string in the quadrilateral on a respective version on the electronic image;
wherein the non-linear projective transform is described by the equation:

$$\begin{bmatrix} x' \\ y' \\ w \end{bmatrix} = \begin{pmatrix} a_x & a_y & a_0 \\ b_x & b_y & b_0 \\ c_x & c_y & 1 \end{pmatrix} \begin{bmatrix} x \\ y \\ 1 \end{bmatrix} \quad (1)$$

where (x, y) is the location of a point on the plane with respect to a first or reference camera viewpoint, and (x', y') is the location of that same point with respect to a second camera viewpoint, and where a, b, and c are weighting factors and w is a scaling factor that is applied to the output x' and y' coordinates.

2. The method of claim 1, further comprising:
storing the one or more variable text strings in a spreadsheet database;
sequentially reading the one or more text strings from the spreadsheet; and
performing the affine transform on each text string to fit each respective text string into its respective rectangular text box.

3. The method of claim 1, further comprising executing the non-linear projective transform given by equation (1) within a page description language (PDL) file.

4. The method of claim 3, further comprising downloading the PDL file to a printer for printing each transformed text string in the quadrilateral on the respective version on the electronic image.

5. The method of claim 1, stored as a set of computer-executable instructions in a non-transitory computer-readable electronic storage medium, and executed by a processor in a digital front end (DFE) of a printer.

6. A system that facilitates performing real-time personalization of electronic images, comprising:
a processor that executes computer-executable instructions stored to a memory, including instructions for:
receiving input coordinates for vertices of a quadrilateral deemed to lie on a planar surface represented in an electronic image;
reading one or more variable text strings from a database;
executing an affine transform to fit each text string into a rectangular text box;
performing a non-linear projective transform on the rectangular text box to move vertices of the rectangular text box to the vertices of the quadrilateral; and
rendering each transformed text string in its quadrilateral on a respective version on the electronic image; and
a printer that prints the electronic image with the text string positioned in the quadrilateral on the electronic image;
wherein the non-linear projective transform is described by the equation:

$$\begin{bmatrix} x' \\ y' \\ w \end{bmatrix} = \begin{pmatrix} a_x & a_y & a_0 \\ b_x & b_y & b_0 \\ c_x & c_y & 1 \end{pmatrix} \begin{bmatrix} x \\ y \\ 1 \end{bmatrix} \quad (1)$$

where (x, y) is the location of a point on the plane with respect to a first or reference camera viewpoint, and (x', y') is the location of that same point with respect to a second camera viewpoint, and where a, b, and c are weighting factors and w is a scaling factor that is applied to the output x' and y' coordinates.

7. The system of claim 6, wherein the one or more text strings is stored in a spreadsheet database, and
wherein the processor sequentially reads the one or more text strings from the spreadsheet and performs the affine transform on each text string to fit each text string into its respective rectangular text box.

8. The system of claim 6, wherein the processor executes the non-linear projective transform given by equation (1) within a page description language (PDL) file.

9. The system of claim 8, wherein the processor downloads the PDL file to the printer for printing each text string in the quadrilateral on the respective version on the electronic image.

10. The system of claim 6, wherein the processor is located in a digital front end (DFE) of the printer.

11. The system of claim 6, wherein the processor outputs the electronic images with respective text strings overlaid thereon to the memory for subsequent recall by the printer.

12. The system of claim 6, wherein the processor outputs the electronic images with respective text strings overlaid thereon directly to the printer for printing.

13. A method of personalizing an electronic image, comprising:
identifying a planar surface in the image;
delineating a quadrilateral on the planar surface;
inserting a variable text string into a rectangular text box using an affine transform;
projecting the text box into the quadrilateral using a non-linear transform; and
rendering the projected text onto the planar surface in the image and outputting a modified electronic image;
wherein the non-linear projective transform is described by the equation:

$$\begin{bmatrix} x' \\ y' \\ w \end{bmatrix} = \begin{pmatrix} a_x & a_y & a_0 \\ b_x & b_y & b_0 \\ c_x & c_y & 1 \end{pmatrix} \begin{bmatrix} x \\ y \\ 1 \end{bmatrix} \quad (1)$$

where (x, y) is the location of a point on the plane with respect to a first or reference camera viewpoint, and (x', y') is the location of that same point with respect to a second camera viewpoint, and where a, b, and c are weighting factors and w is a scaling factor that is applied to the output x' and y' coordinates.

14. The method of claim 13, wherein the affine transform is performed iteratively for a plurality of text strings, and further comprising outputting a plurality of modified electronic images with respective text strings overlaid thereon.

15. The method of claim 13, wherein the modified electronic image is output to a user interface and displayed thereon.

16. The method of claim 13, wherein the modified electronic image is output to a printing device and printed thereby.

* * * * *